(12) United States Patent
Lee et al.

(10) Patent No.: US 9,083,560 B2
(45) Date of Patent: Jul. 14, 2015

(54) INTERACTIVE VISUALIZATION TO ENHANCE AUTOMATED FAULT DIAGNOSIS IN NETWORKS

(75) Inventors: Bongshin Lee, Issaquah, WA (US);
Srikanth Kandula, Redmond, WA (US);
Ratul Mahajan, Seattle, WA (US);
Zhicheng Liu, Atlanta, GA (US)

(73) Assignee: MICROSOFT TECHNOLOGIES LICENSING, LLC., Redmond, WA (US)

( * ) Notice: Subject to any disclaimer, the term of this patent is extended or adjusted under 35 U.S.C. 154(b) by 406 days.

(21) Appl. No.: 12/752,317

(22) Filed: Apr. 1, 2010

(65) Prior Publication Data
US 2011/0246897 A1    Oct. 6, 2011

(51) Int. Cl.
*G06F 3/01* (2006.01)
*G06F 15/177* (2006.01)
*H04L 12/64* (2006.01)
*G06Q 10/10* (2012.01)

(52) U.S. Cl.
CPC ............ *H04L 12/6418* (2013.01); *G06Q 10/10* (2013.01)

(58) Field of Classification Search
USPC .................................................. 715/735, 736
See application file for complete search history.

(56) References Cited

U.S. PATENT DOCUMENTS

| | | |
|---|---|---|
| 6,460,070 B1 | 10/2002 | Turek et al. |
| 7,103,807 B2 | 9/2006 | Bosa et al. |
| 7,251,582 B2 | 7/2007 | Singh et al. |
| 7,305,466 B1 | 12/2007 | Kaffine et al. |
| 7,475,364 B2 * | 1/2009 | Chen et al. ..................... 715/853 |
| 7,523,349 B2 | 4/2009 | Barras |
| 2002/0054169 A1 * | 5/2002 | Richardson ................... 345/854 |
| 2003/0229478 A1 | 12/2003 | Rappaport et al. |
| 2011/0012902 A1 * | 1/2011 | Rajagopalan et al. ........ 345/440 |
| 2011/0099559 A1 * | 4/2011 | Kache et al. ................... 719/318 |

OTHER PUBLICATIONS

"Security Data Visualization: Graphical Techniques for Network Analysis" by Greg Conti Published 2007 ISBN-13: 978-1-59327-143-5 available at : 1. books.google.com/books?isbn=1593271433.*

(Continued)

*Primary Examiner* — Peiyong Weng
(74) *Attorney, Agent, or Firm* — Sandy Swain; Stein Dolan; Micky Minhas

(57) ABSTRACT

Described is a visual analytics system for network diagnostics. The visual analytics system obtains network diagnostic-related information from a diagnostic system. The visual analytics system includes an interactive user interface that displays the representations of network components, including network machines and, zero or more links between those components, (e.g., as appropriate based upon selection or dynamic conditions). The user interface includes a main network view that displays representations of network components, a diagnostics view that displays suggested diagnosis results obtained from the diagnostic system, and a performance counter view that displays performance counter data. User interaction with one of the views correspondingly changes the displays in the other views. The system allows effective exploration of multiple levels of detail, e.g., variable, component, edge level and network levels, for example, via flexible navigation across these levels from the top, the bottom, or anywhere in the middle, while retaining context.

20 Claims, 5 Drawing Sheets

(56) References Cited

OTHER PUBLICATIONS

McGregor, et al., "The NLANR Network Analysis Infrastructure", Retrieved at << http://citeseerx.ist.psu.edu/viewdoc/download?doi=10.1.1.122.727&rep=rep1&type=pdf >>, IEEE Communication Magazine, Computing and Mathematical Sciences Papers, May 2000, pp. 122-128.

Girardin, et al., "A Visual Approach for Monitoring Logs", Retrieved at << http://www.usenix.org/events/lisa98/full_papers/girardin/girardin.pdf >>, System Administration Conference, Proceedings of the 12th USENIX conference on System administration, Dec. 11, 1998, pp. 298-308.

Bod'lk, et al., "Combining Visualization and Statistical Analysis to Improve Operator Confidence and Efficiency for Failure Detection and Localization", Retrieved at << http://citeseerx.ist.psu.edu/viewdoc/download?doi=10.1.1.114.1923&rep=rep1&type=pdf >>, In Proceedings of the 2nd IEEE International Conference on Autonomic Computing (ICAC '05), Jun. 16, 2005, pp. 12.

Bahl, et al., "Towards Highly Reliable Enterprise Network Services via Inference of Multi-Level Dependencies", Retrieved at << http://portal.acm.org/ft_gateway.cfm?id=1282383&type=pdf&coll=GUIDE&dl=GUIDE&CFID=62407306&CFTOKEN=69042862 >>, ACM SIGCOMM Computer Communication Review, vol. 37, No. 4, Oct. 2007, pp. 13-24.

Wang Baldonado, et al., "Guidelines for Using Multiple Views in Information Visualization", Retrieved at << http://portal.acm.org/ft_gateway.cfm?id=345271&type=pdf&coll=GUIDE&dl=GUIDE&CFID=62393748&CFTOKEN=54957683 >>, AVI, Proceedings of the working conference on Advanced visual interfaces, 2000, pp. 110-119.

Bilgic, et al., "D-Dupe: Entity resolution in networks", Retrieved at << http://ieeexplore.ieee.org/stamp/stamp.jsp?tp=&arnumber=4035746&isnumber=4035730 >>, IEEE Symposium on Visual Analytics Science and Technology, Oct. 31-Nov. 2, 2006, pp. 43-50.

Chen, et al., "Pinpoint: Problem Determination in Large, Dynamic Internet Services", Retrieved at << http://roc.cs.berkeley.edu/papers/roc-pinpoint-ipds.pdf >>, Proceedings of the 2002 International Conference on Dependable Systems and Networks, Jun. 23-26, 2002, pp. 10.

Erbacher et al., "Intrusion and Misuse Detection in Large-Scale Systems", Retrieved at << http://www.computer.org/portal/web/csdl/doi/10.1109/38.974517 >>, IEEE Computer Graphics and Applications, vol. 22, No. 1, Jan./Feb. 2002, pp. 2.

Goodall, et al., "Focusing on Context in Network Traffic Analysis", Retrieved at << http://ieeexplore.ieee.org/stamp/stamp.jsp?tp=&arnumber=1607924&isnumber=33767 >>, IEEE Computer Graphics and Applications, vol. 26, No. 2, Mar. 2006, pp. 72-80.

Jardosh, et al., "SCUBA: Focus and Context for Real-Time Mesh Network Health Diagnosis", Retrieved at << http://www.cs.ucsb.edu/~ebelding/txt/pam08_jardosh.pdf >>, Passive and Active Network Measurement, 9th International Conference, PAM 2008, Apr. 29-30, 2008, pp. 1-10.

Kandula, et al., "Detailed Diagnosis in Enterprise Networks", Retrieved at << http://ccr.sigcomm.org/online/files/p243.pdf >>, Applications, Technologies, Architectures, and Protocols for Computer Communication, Proceedings of the ACM SIGCOMM 2009 conference on Data communication, Aug. 16-21, 2009 pp. 12.

Kang, et al., "Evaluating Visual Analytics Systems for Investigative Analysis: Deriving Design Principles from a Case Study", Retrieved at << http://ieeexploreieee.org/stamp/stamp.jsp?tp=&arnumber=5333878&isnumber=5332407 >>, IEEE Symposium on Visual Analytics Science and Technology, Oct. 12-13, 2009, pp. 139-146.

Klein, et al., "Making Sense of Sensemaking 1: Alternative Perspectives", Retrieved at << http://www.ihmc.us/research/projects/essaysonhcc/Perspectives%20on%20Sensemaking.pdf >>, IEEE Intelligent Systems, vol. 21 , No. 4, Jul./Aug. 2006, pp. 69-73.

Klein, et al., "A Data-Frame Theory of Sensemaking", Retrieved at << http://welgan.wikispaces.com/A+Data-Frame+Theory+of+Sensemaking >>, pp. 9, Year: 2007.

Kompella, et al., "IP Fault Localization via Risk Modeling", Retrieved at << http://cseweb.ucsd.edu/~snoeren/papers/score-nsdi05.pdf >>, Proceedings of the 2nd conference on Symposium on Networked Systems Design & Implementation, vol. 2, May 2-4, 2005, pp. 15.

Mansmann, et al., "Visual Analysis of Network Traffic for Resource Planning, Interactive Monitoring, and Interpretation of Security Threats", Retrieved at << http://cnds.eecs.jacobs-university.de/courses/nds-2009/stancumara-hnmap.pdf >>, IEEE Transactions on Visualization and Computer Graphics, vol. 13, No. 6, Nov./Dec. 2007, pp. 1-15.

Mulik, et al., "MTreeDx: A Multicast Network Diagnosis Tool", Retrieved at << http://ieeexplore.ieee.org/stamp/stamp.jsp?tp=&arnumber=1194166&isnumber=26863 >>, Integrated Network Management VII, Managing It All, IFIP/IEEE Eighth International Symposium on Integrated Network Management (IM 2003), Mar. 24-28, 2003, pp. 105-108.

"nCompass for Enterprises", Retrieved at << http://www.opnet.com/solutions/network_planning_operations/nCompass_enterprises.html >>, pp. 1, Year: 2009.

"Open View, HP technologies inc.", Retrieved at << http://www.openview.hp.com >>, pp. 2, Year: 2009.

Perer, et al., "Balancing Systematic and Flexible Exploration of Social Networks", Retrieved at << http://hcil.cs.umd.edu/trs/2006-25/2006-25.pdf >>, IEEE Transactions on Visualization and Computer Graphics, vol. 12, No. 5, Sep. 2006, pp. 8.

Perer, et al., "Integrating Statistics and Visualization: Case Studies of Gaining Clarity during Exploratory Data Analysis", Retrieved at << http://hcil.cs.umd.edu/trs/2008-03/2008-03.pdf >>, Conference on Human Factors in Computing Systems, Proceeding of the twenty-sixth annual SIGCHI conference on Human factors in computing systems, Apr. 5-10, 2008, pp. 10.

"PerfMon", Retrieved at << http://msdn.microsoft.com/en-us/library/aa645516%28VS.71%29.aspx >>, Microsoft Technet, pp. 4, Year: 2009.

Pirolli, et al., "The sensemaking process and leverage points for analyst technology as identified through cognitive task analysis", Retrieved at https://analysis.mitre.org/proceedings/Final_Papers_Files/206_Camera_Ready_Paper.pdf >>, Proceeding Intelligence Analysis on Intelligence analysis May 2-6, 2005, pp. 6.

Rasmussen, et al., "Diagnostic Reasoning in Action", Retrieved at << http://ieeexplore.ieee.org/stamp/stamp.jsp?tp=&arnumber=247883&isnumber=6347 >>, IEEE Transactions on Systems, Man and Cybernetics, Jul./Aug. 1993, pp. 981-992.

Russell, et al., "The Cost Structure of Sensemaking", Retrieved at << http://delivery.acm.org/10.1145/170000/169209/p269-russell.pdf?key1=169209&key2=6171368521&coll=GUIDE&dl=GUIDE&CFID=62401666&CFTOKEN=83722024 >>, Conference on Human Factors in Computing Systems, Proceedings of the INTERACT '93 and CHI '93 conference on Human factors in computing systems, Apr. 24-29, 1993, pp. 269-276.

Shneiderman, et al., "Network Visualization with Semantic Substrates", Retrieved at << http://ieeexplore.ieee.org/stamp/stamp.jsp?tp=&arnumber=4015424&isnumber=4015412 >>, IEEE Transactions on Visualization and Computer Graphics, vol. 12, No. 5, Sep.-Oct. 2006, pp. 733-740.

Stasko, et al., "Jigsaw: Supporting Investigative Analysis through Interactive Visualization", Retrieved at << http://www.cc.gatech.edu/~stasko/papers/vast07-jigsaw.pdf >>, Virtual reality, archeology, and cultural heritage, Proceedings of the 2007 IEEE Symposium on Visual Analytics Science and Technology, Oct. 30-Nov. 1, 2007, pp. 8.

Thomas, et al., "Illuminating the Path: the Research and Development Agenda for Visual Analytics", Retrieved at << http://nvac.pnl.gov/docs/RD_Agenda_VisualAnalytics.pdf >>, NVAC and IEEE Computer Society, 2004, pp. 190.

Yemini, et al., "High Speed and Robust Event Correlation", Retrieved at << http://research.microsoft.com/en-us/um/people/alicez/papers/ieeecomm96.pdf >>, IEEE Communications Magazine, May 1996, vol. 34, No. 5, pp. 82-90.

* cited by examiner

INTERACTIVE VISUALIZATION TO ENHANCE AUTOMATED FAULT DIAGNOSIS IN NETWORKS

BACKGROUND

Network diagnosis is directed towards the task of finding the root cause of faults observed in a network. The complexity of modern networks makes network diagnosis a difficult, frustrating, and time-consuming endeavor. As a result, various automatic tools have been developed to help system administrators diagnose faults.

However, due to the difficulty of the problem, automated tools do not always provide an accurate diagnosis. To complete the diagnostic task, system administrators still need to verify the output (i.e., probable causes) of the automated tools, and, when the output is incorrect, the administrators have to manually identify the correct cause. This is challenging because there is a large amount of data that has to be dealt with, using sophisticated analysis techniques. For example, the administrators need to access the underlying raw data (e.g., various health indicators of individual applications) in addition to the diagnostic engine's analysis.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a visual analytics system for network diagnostics is coupled to obtain network diagnostic-related information from a diagnostic system. The visual analytics system includes an interactive user interface that displays the representations of network components, including network machines and zero or more links between those components, (e.g., as appropriate based upon selection or dynamic conditions).

In one implementation, the user interface includes a main network view that displays the representations of the network components, a diagnostics view that displays suggested diagnosis results obtained from the diagnostic system, and a performance counter view that displays performance counter data with respect to at least one network component represented in the main network view. A user interface mechanism (e.g., a mouse or other pointing device) provides for interaction with the views, in which interaction with the main network view correspondingly changes the displays in the diagnostics view and the performance counter view, interaction with the diagnostics view correspondingly changes the displays in the main network view and the performance counter view, and interaction with the performance counter view correspondingly changes the displays in the main network view and the diagnostics view.

In one aspect, the visual analytics system facilitates analysis by providing visualization for effective exploration of multiple levels of detail, with diagnostic systems differing in the algorithms at each level. Levels may include a variable level, a component level, an edge level and a network level, for example. The system allows flexible navigation across these levels, while retaining context. The navigation can start from the top, the bottom, or anywhere in the middle.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a visual analytics system that couples interactive visualization with an automated diagnostic system. The system enables system administrators to verify the correctness (or incorrectness) of the diagnostic system's automatic analysis at different levels of detail, including via tightly-coupled views that allow system administrators to move seamlessly across levels while retaining appropriate context. In one implementation, visualization is provided in the form of directed graphs, based on a machine-oriented metaphor, which are integrated with a multi-level automated analytic reasoning engine for network fault diagnosis.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and networking in general.

Figure 1:
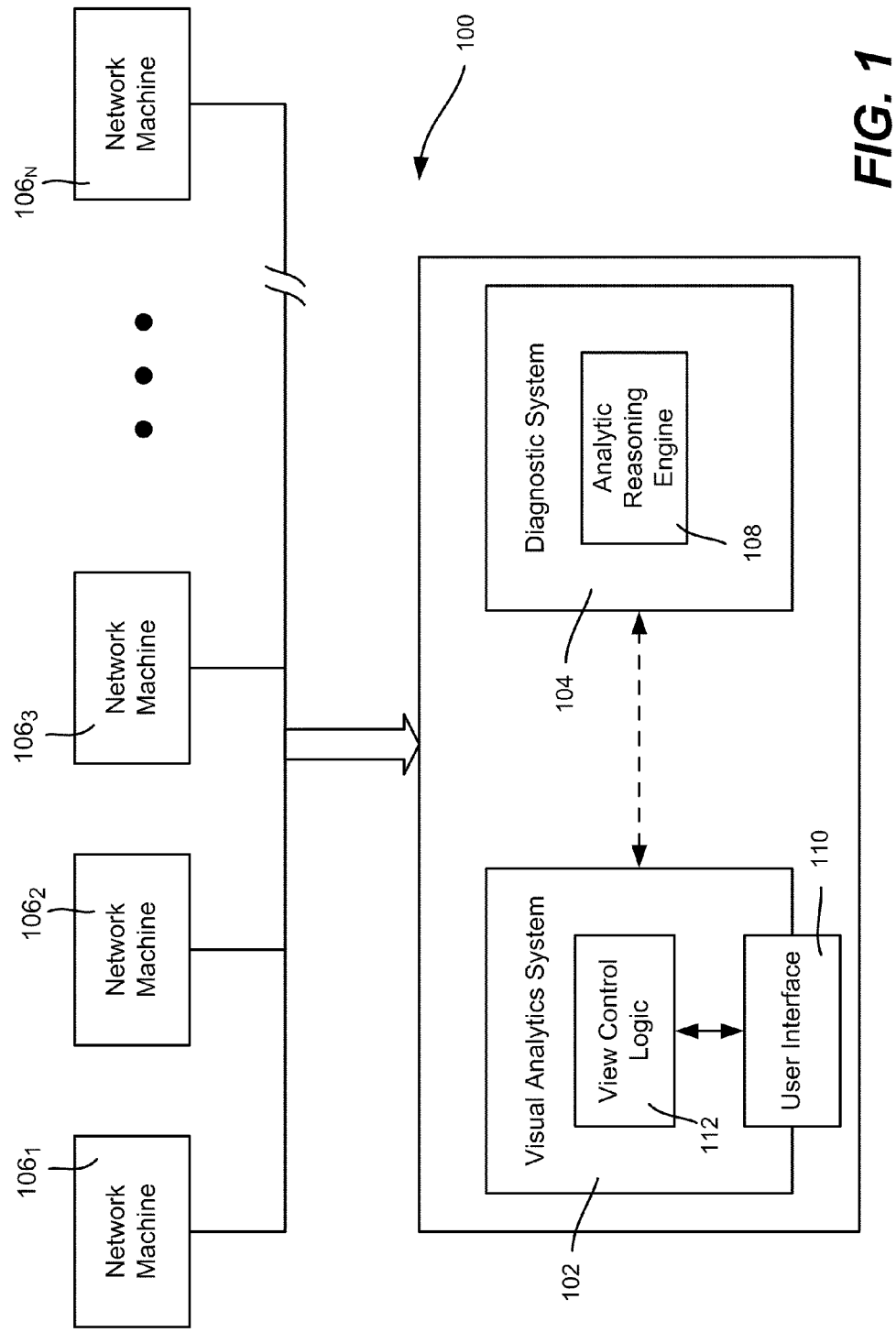
FIG. 1 is a block diagram representing an example network in which interactive visualization to enhance automated fault diagnosis in networks is provided.

FIG. 1 shows a general example network 100, which includes a visual analytics system 102 as described herein that provides interactive visualization of network diagnostics by coupling with a diagnostic system 104. As shown in FIG. 1, enterprise networks typically include client and server machines $106_1$-$106_N$ interacting with each other.

As is known, users often experience network faults as anomalies in the behavior of client applications. For example, an email client (e.g., an application) may be unable to send email. As set forth above, diagnosing such faults is challenging for system administrators because network components interact in complex ways and the root cause may be any one of the many network components that influence the client application, directly or indirectly.

A typical strategy for network diagnosis is to follow possible courses of events backwards from the observed anomalous effect. Starting with the perceived faulty component, diagnosticians may examine its state and look for directly impacting components that may be causing the observed problem. Determining the state of a particular component is often non-trivial and may require examining a large information space. Further, tracing backwards from the component that is experiencing the fault involves repeatedly branching-off to observe other possible candidates that may be causing the problem. An alternative is to trace forwards from 'likely' causes to see which cause can explain most of the observed anomalies.

As a result, the space for examination generally is too large to handle manually, and diagnostic tools are employed, such as the diagnostic system 104 of FIG. 1. These tools tend to use the above-described backwards tracing strategy; starting from raw information, they derive logical assumptions that are used for successively higher-level reasoning until some conclusions are reached. The raw information for a network component is captured using one or more variables (also called performance counters) that describe its behavior. Different components have different variables, e.g., variables may reflect CPU usage, memory usage, and the amount of outgoing network traffic.

The reasoning process, e.g., implemented in an analytic reasoning engine 108 of the diagnostic system 104, can be divided across four semantic levels of detail, with diagnostic systems differing in the algorithms at each level. The levels include the variable level, the component level, the edge level and the network level.

At the variable level, the analytic reasoning engine 108 determines which variables indicate abnormal behavior, often based on how different statistically the current values are to historical values. At the component level, based on the analysis of individual variables of a component, the analytic reasoning engine 108 determines if the component as a whole is abnormal.

At the edge level, that is, given two components in the dependency graph with an edge between them, the analytic reasoning engine 108 computes an edge weight, corresponding to the likelihood of the source component actually impacting the target component. This computation is based on the state of both components. At the network level, given a faulty component, a search in the entire network is conducted to find likely culprits, which are connected to the faulty component through a series of edges with high weights. Based on these path level weights, the possible culprits are ranked from most likely to the least likely in the output.

Due to the complexity of network problems, unless a narrow set of faults is targeted, no known diagnostic system always provides an accurate diagnosis. Moreover, inaccuracies can occur at each level. At the variable level, for instance, if abnormality is statistically determined, it is deemed abnormal even when a variable behaves better than before. Such inaccuracies propagate to higher levels and may—be amplified as they combine with other inaccuracies.

As described herein, the visual analytics system 102 couples to the diagnostic system 104/analytic reasoning engine 108 to facilitate network fault diagnosis. Note that the systems 102 and 108 may be coupled separately from the network link (as indicated by the dashed arrow), and may, for example, run on the same physical machine. Moreover, the diagnostic system 104 is ordinarily not directly connected to the network components at the time of diagnosis (as indicated by the dashed line). One suitable diagnostic system 104/underlying analytic engine 108 comprises "NetMedic" as described by Kandula, S., Mahajan, R., Verkaik P., Agarwal, S., Padhye, J., and Bahl, P. in "Detailed diagnosis in enterprise networks," *Proc. SIGCOMM* 2009, (2009). However, the visual analytics system 102 may be coupled to any other diagnostic engine for enterprise networks that share a common overall framework; (note that many do).

As shown in FIG. 1, the visual analytics system 102 includes a user interface 110 that displays various information, as described below. The display on the user interface 110 is controlled in part by view control logic 112, which among other operations changes what is displayed (and how) based on user interaction, and also coordinates the integration of different views of data so as to be consistent among the different views, as also described below.

As will be understood, the visual analytics system 102 enables users to start diagnosing at any level of abstraction, which can be accomplished by showing the analysis output for the various levels. Further, the visual analytics system 102 generally lets users seamlessly traverse levels, instead of having separate exploration modes. Moreover, the visual analytics system 102 enables users to retain context for what they are doing as they traverse levels, instead of forcing them to start over at each level.

In one implementation, the visual analytics system user interface 110 includes one screen 220 (FIG. 2) that simultaneously presents a representation of the network components and information at component, edge and network levels; a representation of the diagnostics systems' results at the network level; and a representation of performance counters' data that displays variable level and raw information about various performance counters associated with a component.

Figure 2:
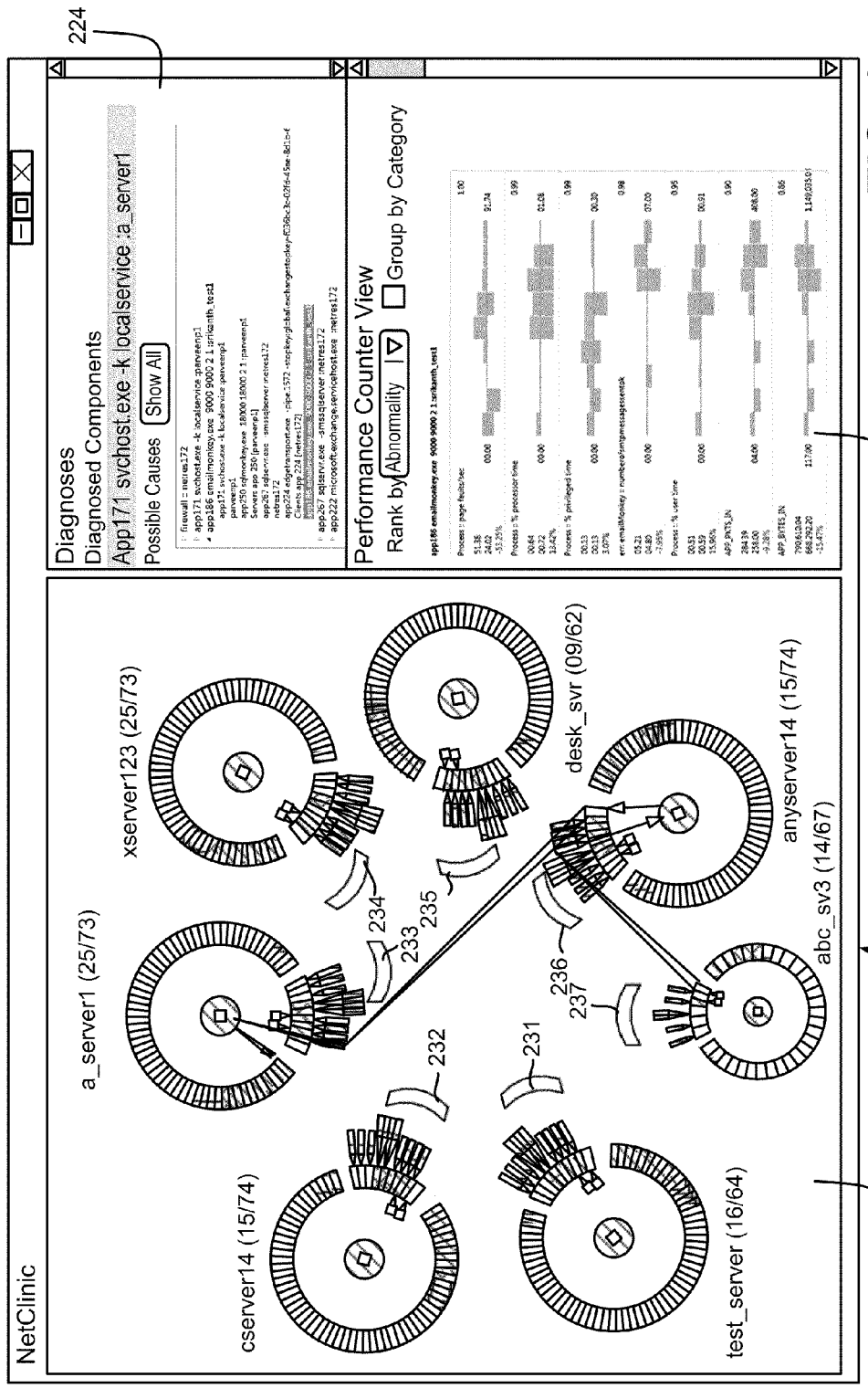
FIG. 2 is a representation of a screenshot of a user interface that facilitates interactive visualization of network components.

More particularly, in one implementation, the example user interface screen 220 of FIG. 2 comprises three general areas, namely a main network view 222 that visualizes the network components at component, edge and network levels, a diagnosis view 224 that presents the suggested diagnosis results at the network level, and a performance counter view 226 that displays the various relevant performance counter data.

As can be readily appreciated, diagnosis across even relatively few machines may involve hundreds of components. To display a large number of components, the main network view 222 includes representations of the components and their relationships. For most users, a machine is the most common grouping unit for network components, e.g., applications and processes belong to the machines on which they run, and communication between applications depends on the communication infrastructure between machines. Thus, in one implementation, the main network view 222 layout is based upon a machine-oriented metaphor.

Figure 3:
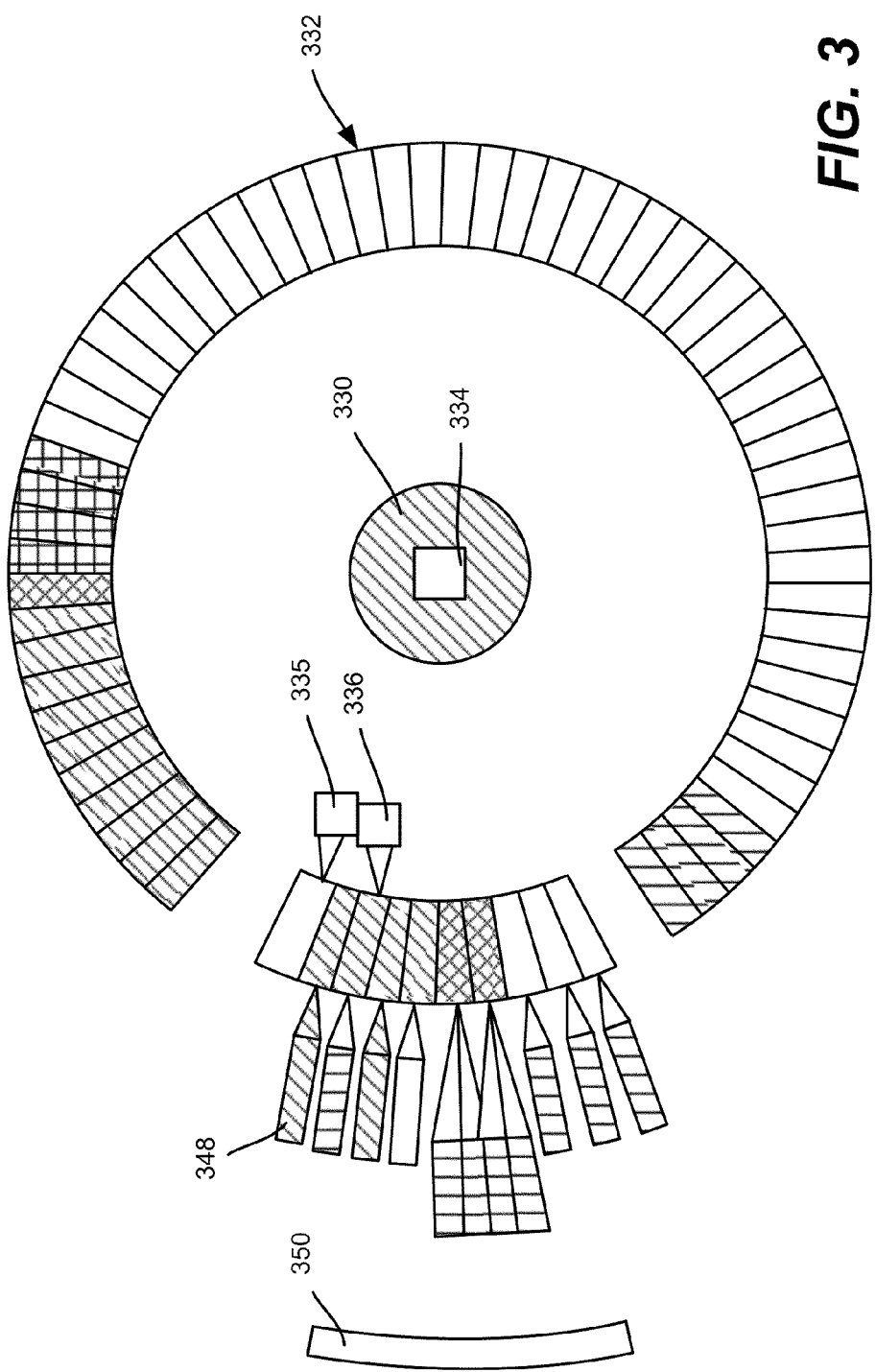
FIG. 3 is a representation of a how a network machine, its applications/processes and related components are presented to users in one example implementation.

As generally represented in FIGS. 2 and 3, in the main network view 222, network components are grouped into machine clusters. The circular node 330 (FIG. 3) at the center of each cluster represents one machine, and the applications (which are generally synonymous with processes as used herein) running on the machine are displayed as segments 332, forming a ring that generally encircles the machine node 330. The sizes of the segments may be normalized such that a machine with more running applications has a bigger ring.

In the example implementation shown, square nodes represent configurations 334-336. For example, in FIG. 3, the machine configuration node 334 is placed at the center of the machine's circle, while nodes 335 and 336 representing application configurations are placed adjacent to the application's segment on the ring.

In the exemplified implementation of FIG. 2, the main network view 222 arranges the displayed machine representations in a layout that generally surrounds a central point, e.g., in a circular layout. Other ways of surrounding a central point (e.g., an oval, polygon) and so forth are equivalent alternatives. Applications on one machine with connections to applications on other machines are oriented to face the center of the layout circle, and a visual gap or other suitable indication separates those applications from local-only applications. Machine names are displayed proximate each machine cluster, and each machine name may be followed with two numbers, one as a count of intra-machine applications and the other as a count for inter-machine applications.

As can be readily appreciated, it is not feasible to display all machines in a large network at once, although scrolling and zooming may be provided. On contemporary display monitors, the layout scales well up to about ten machines; as the number of machines increases, the blank area in the center changes and node sizes become smaller. However, it is rare that every machine needs to be represented at once. Instead, when a fault is reported, the automated reasoning engine may choose the machines that are most likely relevant to the fault. Additional interaction to allow administrators to add or remove machines may be provided.

Visualizing links between machines is another aspect that is provided by the technology herein with respect to the graph layout. Due to the rich interaction between network components, the number of links is often high, (e.g., approximately three times as many links as the number of network components have been observed), and showing too many—links clutters the view with many—crossings and occlusions. Further, link bundling tends to conceal the direction of the link, which is often needed for network diagnosis.

Instead of showing all the links all the time, the visual analytics system 102 may dynamically and/or selectively show only those links that are relevant to current user explorations. Further, the system provides a way for users to customize an edge view by turning on/off different edges or logical groups of edges. As generally represented in FIG. 2, in one implementation, the direction of an inter-machine edge/link is shown by a long narrow triangle that points to the receiver; intra-machine edges are shown as a straight line with an arrowhead. Alternative implementations may use other visual representations to show direction.

In addition to components that correspond to real network entities, diagnostic systems may have logical components. For example, NetMedic has a logical component called "neighbor set" 348 (FIG. 3) that represents the interaction of an application with its peers. Neighbor sets of networking applications are visualized as segments along the additional outer arc so that when edges are shown, they will cross through the center of the circular layout and avoid occluding potentially relevant nodes.

Also, firewall rules at each machine may be represented, such as arcs 231-237 that "satellite" the machine clusters; (an additional firewall rule 350 is shown in FIG. 3). Because firewall rules impact every communication to and from the machine, these arcs have a high degree and generally may be placed close to the center of the overall circular layout. Some diagnostic systems may have additional component types (e.g., routers), and the layout may be extended to include such component types.

The visual analytics system 102 forms the basis for both top-down and bottom-up exploration across multiple levels of information. Top-down exploration lets users quickly verify the output of automated analysis at each higher level by looking at the information at the lower level on which it is based. For instance, a user can verify the edge level analysis by looking at the states of the components on either end of the edge. Bottom-up exploration, going from lower to higher levels, lets users form and evaluate their own hypothesis. For instance, users can estimate which neighbor of a component impacts it the most by looking at their component states.

For top-down exploration, a common start point is the topmost network level. At this level, users generally want to see the diagnoses results computed by the analytic reasoning engine 108 in the form of an impact path, that is, the set of edges from the suspected culprit to the component being diagnosed. This is achieved through coordination between the network view 222 and the diagnosis view 224.

By way of example in one implementation, when users double-click on a component, the visual analytics system 102 in response shows diagnostic results in the diagnosis view 224. In this view, to support diagnosing multiple components in one session, a list at the top keeps track of components being diagnosed (the "effects") with the active component highlighted in some way, e.g., shown in green. The list at the bottom shows a ranked list of the top N (e.g., five) likely culprits of the active effect. By default, the first culprit is selected and the path from the culprit to the effect is highlighted in the network view 222; the components on this path stay in full opacity, while other components fade into the background, for example. This path visualization visualizes the nature of the hypothesis for users, without worrying about the exact components involved. For example, in FIG. 2, a culprit application on server abc_sv3 is impacting the effect application on server a_server1 through two applications on anyserver14 and one on a_server1.

To analyze a path in detail (e.g., to verify its accuracy), a user may access the relevant edge and component level information. As described above, edge direction is shown by a tapered triangular representation for edges across machines or by a straight line with an arrowhead for edges inside machine clusters. Coloring or the like (e.g., thickness) may be used to encode the weight value as computed by the analytic reasoning engine's edge level analysis. For example, the darker the (e.g., red) coloring, the more likely the source impacts the target.

Other user interface interaction techniques may be employed. For example, mousing over an edge may bring up a tooltip that shows the names of the two surrounding components and the computed weight value. A mouse-over on a component may show a tooltip or the like, with the component's name and the computed abnormality value (as computed by the analytic reasoning engine's component level analysis). Drop-down menus may be used, e.g., a user may right click on a component (or edge) or otherwise invoke a drop-down menu with respect to a component (or edge), such as to select "Diagnose," "Display Performance Counters" or "Mark as Uninteresting" with respect to a selected component.

Similarly, the appearance (e.g., color) of a component may be used to encode an abnormality as computed by the analytic reasoning engine's component level analysis. For example, when variable values are missing for certain components, which may happen because the application is no longer running or in rare cases due to data loss, the component nodes may appear differently (e.g., be colored gray).

The computed values at the component and edge level can be verified and understood by using variable level and raw information. Each row in the performance counter view 226 may represent a counter for a component, and rows may be sorted (e.g., by default) on the abnormality values of the counter. In each row, the name of the counter is on the top left, the abnormality value (the result of variable level analysis) is on the top right, and raw information (e.g., performance counter values) in both the historical "training" period and the current diagnosis period may be represented as a histogram in the middle. In the exemplified histograms, the horizontal axis represents the range of the values, while the bars represent the frequency of values in each of X (e.g., nine) bins into which the range is divided; both minimum and maximum values are shown.

To enable easy visual comparison between the historical and current values, in one implementation the visual analytics system 102 may show historical values at the top in one color (e.g., with blue bars) and current values at the bottom in another color (e.g., with brown bars). They also (or alternatively) may be shown side-by side for each bin. The exemplified visual analytics system 102 also shows averages of the historical and current values and the percentage change from the historical to the current average on the left of the histogram. These numbers help users determine if the deviation between historical and current values in terms of distribution patterns is semantically meaningful. The combination of the histogram and the numerical values allow fast verification and comprehension.

Figure 4:
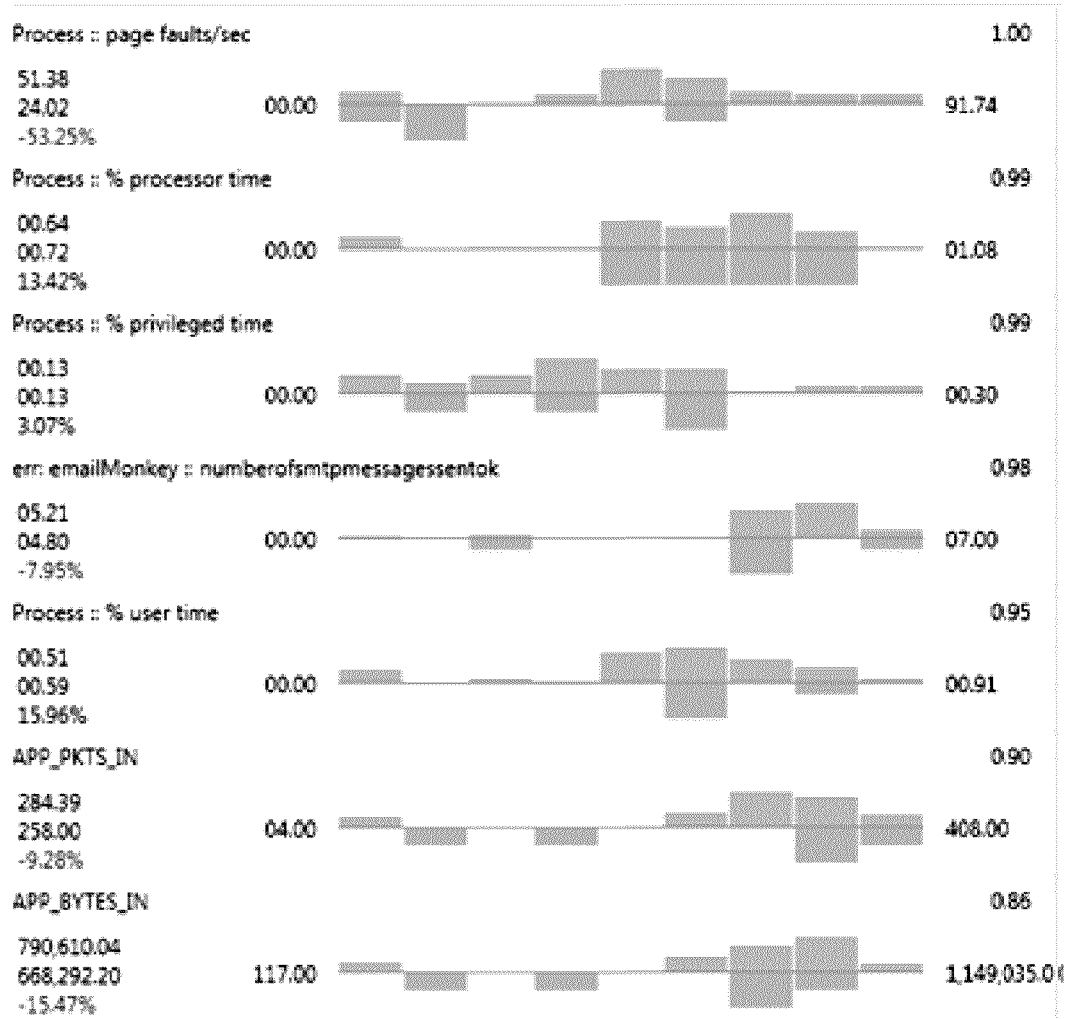
FIG. 4 is a representation of how performance counter information may be presented to a user of the interactive visualization system.

In the example of FIG. 2, variable level and raw information about the application "emailmonkey.exe" are displayed in the performance counter view 226 (with the counters portion shown enlarged in FIG. 4). In the second row, the engine 108 assigned a high abnormality value (0.99 out of 1) to the variable "Process:: % processor time" through its statistical computation. However, by looking at the histogram, a user can efficiently determine that there is not much discrepancy between the distributions of the training and current values. Further, the maximum of the raw data is 1.08%, which semantically is too low to be an abnormal value for CPU utilization. In this way, users can quickly sort through a large number of counters to determine which variables are indeed abnormal and hence which neighbors are worthy of blame.

Bottom-up exploration is another scenario facilitated by the various views. As described above, the visualization of raw information lets users reach variable level hypothesis, and see how variable level information lets them reach component level hypothesis. To go from component to edge level, at any time, users can mouse-over a component to highlight both the component and its adjacent neighbors with directed edges joining them. Clicking on a component marks it in some way (e.g., colors it yellow) and highlights its adjacent neighbors as well. Users can hide outgoing edges from the component, e.g., because incoming edges are more important for diagnosing when backtracking from the effect.

In this way, users can explore the neighbors of any component that are not included in the diagnosis paths. By examining the abnormalities and performance counters of adjacent components, users can reach edge level hypothesis (i.e., if the impact really flows along an edge). For example, a causal impact is not possible if the source application is sending too little data and the target application is consuming too much memory, even if both components are independently abnormal. By stitching edges together, users can reach a network level hypothesis.

Turning to view coordination and common path, user exploration is facilitated by the coordination across the views. For example, each of the top N (e.g., five) causes in the diagnosis view 224 can be expanded to show a list of the names of the components in the corresponding cause-effect path. Users can traverse through the list, and focus on a component. The component receiving focus is then highlighted, e.g., given a black thick border. The performance counter view is updated accordingly to show counter information regarding the focused component.

The diagnosis paths for the top five suggested causes often share components and edges. For example, the path of impact for multiple diagnoses determine may pass through the local machine, even though the eventual culprits are different applications on that machine. Knowing that a path is common helps by letting the user not have to replicate the work of re-verifying the common part of the path when moving from one cause to another. Also, this lets users focus on what to evaluate first, because shared paths tend to be more likely correct.

The visual analytics system 102 may provide visual cues about the common path in some way, such as by using a thicker border with thickness corresponding to the frequency of appearance across the top N (e.g., five) causes. The visual analytics system 102 also enables users to see the union of the five paths simultaneously, e.g., by providing the "Show All" button in the diagnosis view 224. Further, when a component appears in multiple diagnosis paths, if users determine that the component cannot possibly impact the effect while examining one path, they can mark the component as uninteresting and the component's appearance changed (e.g., given a blur effect) so that users can quickly rule out other paths on which this component appears.

There is thus provided a visual analytics system that couples interactive visualization with an automated reasoning engine, which in general, simplifies and transforms fault diagnosis tasks. Administrators may use the analytic engine without sacrificing the flexibility of self-exploration, by exposing information and supporting seamless exploration across analysis levels.

Further, users may modify the automatic analysis. For example, if a user finds that the edge level analysis for a particular edge is incorrect, the user may modify the weight of that edge using a slider control. The diagnostic engine receives the change as input, and re-computes a new set of diagnostic results. By enabling such two-way human-machine interaction, the capabilities of the diagnostic engine can be more fully utilized, and the users' tasks can be simplified.

Exemplary Operating Environment

Figure 5:
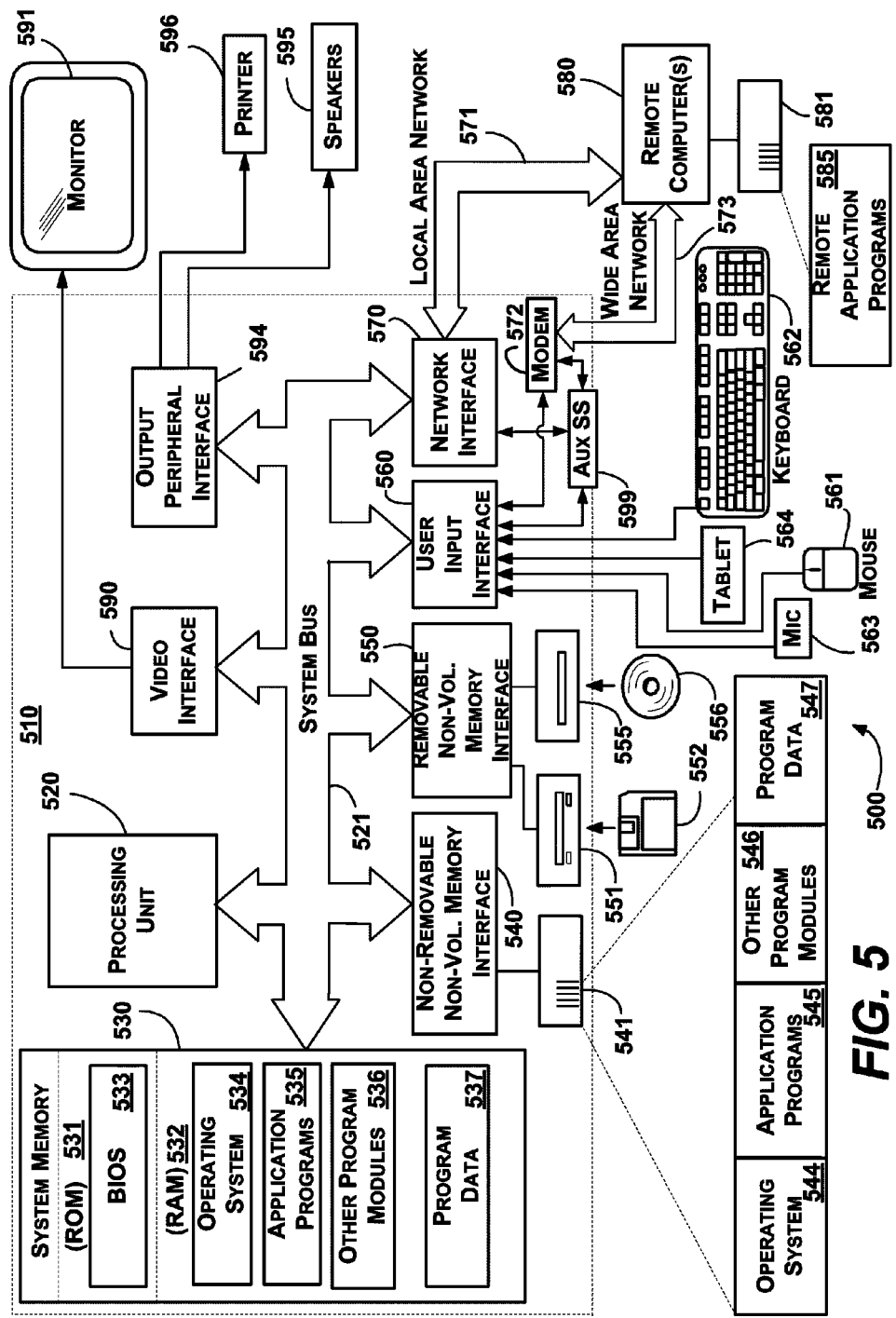
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment including a computer network, a system comprising at least one hardware processor, a memory communicatively coupled to the at least one hardware processor and including components comprising, a visual analytics system for network diagnostics, the visual analytics system coupled to a diagnostic system to obtain network diagnostic-related information from the diagnostic system, the visual analytics system including an interactive user interface that displays a network view comprising representations of at least some network components, in which interaction with a representation of a network component causes diagnostic-related information associated with that component to be displayed across at least two levels of detail, the network view comprising a visual indicator to separate representations of intra-machine applications from representations of inter-machine applications running on a plurality of network machines, and connections between applications running on at least one network machine in which interaction with a connection changes the display of the representations to indicate selection of the connection and the at least one network machine associated with the connection.

2. The system of claim 1 wherein the user interface includes a main network view that displays the representations of network components, the components including a plurality of network machines, and zero or more links between the network components.

3. The system of claim 2 wherein for each machine, the representations of the applications for that machine comprise segments that that generally encircle a representation of visible information associated with the machine.

4. The system of claim 2 wherein the representations of the components comprising the network machines are arranged such that viewed together, representations of the machines generally surround a central point.

5. The system of claim 2 wherein the representations of the network components in the main network view include representations of firewalls of the machines, or representations of configurations associated with the machines, or both representations of firewalls of the machines and representations of configurations associated with the machines.

6. The system of claim 2 further comprising a diagnostics view that displays suggested diagnosis results obtained from the diagnostic system, or a performance counter view that displays performance counter data with respect to at least one network component represented in the main network view, or both a diagnostics view that displays suggested diagnosis results obtained from the diagnostic system, and a performance counter view that displays performance counter data with respect to at least one network component represented in the main network view.

7. The system of claim 1 wherein the user interface includes: a main network view that displays representations of network components, the components including a plurality of network machines, and zero or more links between the network components; a diagnostics view that displays suggested diagnosis results obtained from the diagnostic system; a performance counter view that displays performance counter data with respect to at least one network component represented in the main network view; wherein interaction with the main network view to select a selected network machine updates information displayed in the diagnostics view to provide information corresponding to the selected network machine, and updates performance counter data displayed in the performance counter view to provide performance counter data corresponding to the selected network machine; and wherein interaction with the diagnostics view to select a selected network machine updates the representation of at least one network component in the main network view to indicate selection of the selected network machine, and updates performance counter data displayed in the performance counter view to provide performance counter data corresponding to the selected network machine.

8. The system of claim 1 wherein the user interface includes a main network view that displays representations of network components, the components including the plurality of network machines, and at least one link between the network machines, in which each link between two network machines is represented to include visible information corresponding to a direction of that link.

9. The system of claim 1 wherein the user interface displays diagnostic results at different levels of detail.

10. The system of claim 9 wherein the different levels of detail comprise a variable level, a component level, an edge level and a network level.

11. The system of claim 9 wherein interaction with the user interface provides for navigation across the different levels while retaining context, in which the navigation may begin at a top level, a bottom level, or any level between a top and bottom level.

12. In a computing environment, a method performed on at least one processor, comprising: receiving network diagnostic data, including suggested diagnosis results obtained from a diagnostic system and performance counter data; displaying representations of network components, including representations of a plurality of network machines in which at least some of the representations comprise representations of intra-machine applications and representations of inter-machine applications for display on a network view and representations of links between the intra-machine applications or between the inter-machine applications in which each link is represented to include a direction of that link; displaying the representations of the inter-machine applications separately from the representations of the intra-machine applications; displaying information corresponding to at least some of the suggested diagnosis results obtained from the diagnostic system; displaying information corresponding to at least some of the performance counter data; and detecting interaction with a displayed representation of a network component, and in response to the interaction, changing the appearance of at least one representation of a network machine and displaying diagnostic results corresponding to at least two different levels of detail.

13. The method of claim 12 wherein displaying representations of network components includes displaying a visual separation between the representations of the inter-machine applications and the representations of the intra-machine applications.

14. The method of claim 12 wherein displaying the information corresponding to at least some of the performance counter data comprises displaying at least one histogram.

15. The method of claim 12 further comprising, in response to the interaction, changing the information corresponding to at least some of the performance counter data.

16. The method of claim 12 further comprising, detecting interaction with the information corresponding to at least some of the suggested diagnosis results, and in response, changing the appearance of at least one representation of a network machine and changing the information corresponding to at least some of the performance counter data.

17. The method of claim 12 further comprising, detecting interaction directed towards navigation across the at least two different levels of detail, and in response, displaying the diagnostic results.

18. In a computing environment, a system comprising at least one hardware processor, a memory communicatively coupled to the at least one hardware processor and including components comprising: a user interface configured to provide a main network view that displays representations of network components and representations of inter-machine applications and inter-machine applications in which a visual space operative to separate the representations of inter-machine applications from the representations of the intra-machine applications, a diagnostics view that displays suggested diagnosis results obtained from a diagnostic system, and a performance counter view that displays performance counter data with respect to at least one network machine represented in the main network view; and a user interface mechanism configured to provide interaction with the views, in which interaction with the main network view changes the displays in the diagnostics view and the performance counter view in response to the interaction with the main network view, interaction with the diagnostics view changes the displays in the main network view and the performance counter view in response to the interaction with the diagnostics view, interaction with the performance counter view changes the displays in the main network view and the diagnostics view in response to the interaction with the performance counter view, and interaction directed towards navigation across at least two different levels of detail causes display of diagnostic results corresponding to the at least two different levels of detail.

19. The system of claim 18 wherein the main network view displays representations of one or more links between representations of network machines, wherein the interaction with the main network view corresponds to interaction with a link, and wherein the interaction with the link changes the display in the main network view to indicate selection of the link and two network machines associated with the link.

20. The system of claim 18 wherein the interaction with the diagnostics view corresponds to selecting a selected network machine, and wherein the interaction changes the display in the main network view to indicate the selected network machine, and wherein the interaction changes the display in the performance counter view to show performance counter data corresponding to the selected machine.

\* \* \* \* \*